(12) United States Patent
Arslan et al.

(10) Patent No.: US 11,038,372 B2
(45) Date of Patent: Jun. 15, 2021

(54) METHOD AND CONTROL DEVICE FOR OPERATING A STATIONARY, ELECTRIC ENERGY STORAGE THAT IS PROVIDED FOR AN ELECTRIC CONSUMPTION UNIT

(71) Applicant: Bayerische Motoren Werke Aktiengesellschaft, Munich (DE)

(72) Inventors: Eren Arslan, Munich (DE); Michelle Bogen, Mountain View, CA (US); Lukas Maul, Munich (DE); Florian van Triel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 147 days.

(21) Appl. No.: 16/565,667

(22) Filed: Sep. 10, 2019

(65) Prior Publication Data
US 2020/0083742 A1    Mar. 12, 2020

(30) Foreign Application Priority Data

Sep. 11, 2018 (EP) ..................... 18193860

(51) Int. Cl.
*H02J 13/00* (2006.01)
*H02J 3/32* (2006.01)
(Continued)

(52) U.S. Cl.
CPC .......... *H02J 13/00007* (2020.01); *H02J 3/32* (2013.01); *G06Q 10/06* (2013.01); *G06Q 40/04* (2013.01); *G06Q 50/06* (2013.01); *H02J 3/381* (2013.01)

(58) Field of Classification Search
None
See application file for complete search history.

(56) References Cited

U.S. PATENT DOCUMENTS 8,588,991 B1 * 11/2013 Forbes, Jr. ........ H02J 13/00034
700/295
9,727,898 B2    8/2017 Park et al.
(Continued)

FOREIGN PATENT DOCUMENTS

CN    104466994 A * 3/2015 ............... H02J 3/28
CN    110034611 A * 7/2019 ............. H02J 15/00

OTHER PUBLICATIONS

Walker et al., "Incentives for the reuse of electric vehicle batteries for load-shifting in residences", Jan. 2015, International Journal of Process Systems Engineering. (Year: 2015).*

(Continued)

*Primary Examiner* — Mohammad Ali
*Assistant Examiner* — Kelvin Booker
(74) *Attorney, Agent, or Firm* — Crowell & Moring LLP

(57) ABSTRACT

A method operates an electric energy storage that is provided for an electric consumption unit, wherein the electric consumption unit is additionally coupled to an electric power grid. The method is characterized in that the control device performs the following steps of a) providing different operation logics for controlling the power flow as a function of the state of charge and of a total unit load, b) observing a status signal that is signaling the present and/or the next supply condition of the grid, c) selecting one of the operation logics as an active operation logic depending on a current value of the status signal, and d) operating the power converter according to the active operation logic.

8 Claims, 3 Drawing Sheets

(51) Int. Cl.
*G06Q 50/06* (2012.01)
*G06Q 10/06* (2012.01)
*G06Q 40/04* (2012.01)
*H02J 3/38* (2006.01)

(56) References Cited

U.S. PATENT DOCUMENTS

| | | | | |
|---|---|---|---|---|
| 10,270,249 B2* | 4/2019 | Covic | | H02J 3/382 |
| 10,454,271 B2* | 10/2019 | Covic | | H02J 13/00034 |
| 10,775,824 B2* | 9/2020 | Main | | H02J 13/00017 |
| 2006/0276938 A1* | 12/2006 | Miller | | H02J 3/32 |
| | | | | 700/295 |
| 2007/0005192 A1* | 1/2007 | Schoettle | | H02J 3/32 |
| | | | | 700/286 |
| 2008/0052145 A1* | 2/2008 | Kaplan | | H02J 3/322 |
| | | | | 705/7.12 |
| 2010/0217651 A1* | 8/2010 | Crabtree | | G06Q 10/00 |
| | | | | 705/7.22 |
| 2011/0231028 A1* | 9/2011 | Ozog | | G06Q 50/06 |
| | | | | 700/291 |
| 2012/0296482 A1* | 11/2012 | Steven | | G05B 13/04 |
| | | | | 700/291 |
| 2013/0282193 A1 | 10/2013 | Tyagi et al. | | |
| 2013/0334880 A1 | 12/2013 | Jerphagnon | | |
| 2013/0345884 A1* | 12/2013 | Forbes, Jr. | | H02J 13/0086 |
| | | | | 700/286 |
| 2013/0346139 A1* | 12/2013 | Steven | | G06Q 10/06314 |
| | | | | 705/7.24 |
| 2013/0346768 A1* | 12/2013 | Forbes, Jr. | | G05F 1/66 |
| | | | | 713/310 |
| 2015/0088576 A1* | 3/2015 | Steven | | G06Q 50/06 |
| | | | | 705/7.22 |
| 2015/0094968 A1* | 4/2015 | Jia | | G01R 21/133 |
| | | | | 702/60 |
| 2015/0227124 A1 | 8/2015 | Arya et al. | | |
| 2015/0277410 A1* | 10/2015 | Gupta | | H02J 3/32 |
| | | | | 700/295 |
| 2016/0056628 A1* | 2/2016 | Burstall | | H02J 3/32 |
| | | | | 700/295 |
| 2016/0079757 A1* | 3/2016 | Matan | | H02J 13/00 |
| | | | | 307/24 |
| 2016/0248255 A1 | 8/2016 | Rive et al. | | |
| 2017/0091878 A1 | 3/2017 | Subburaj | | |
| 2018/0076629 A1* | 3/2018 | McMorrow | | H02J 7/35 |
| 2018/0144414 A1 | 5/2018 | Lee et al. | | |
| 2019/0013672 A1* | 1/2019 | McDaniel | | H04L 12/2803 |
| 2019/0033353 A1* | 1/2019 | Quinn | | G01R 21/008 |
| 2019/0089163 A1* | 3/2019 | Wellner | | H02J 7/35 |
| 2019/0260050 A1* | 8/2019 | Chigan | | H01M 8/04335 |
| 2020/0083712 A1* | 3/2020 | Arslan | | H02J 3/32 |

OTHER PUBLICATIONS

Koutsopoulos et al., "Challenges in Demand Load Control for the Smart Grid", Sep./Oct. 2011, University of Thessaly and Center for Research and Technology Hellas, IEEE Network. (Year: 2011).*

Lavrova et al., "Analysis of Battery Storage Utilization for Load Shifting and Peak Smoothing on a Distribution Feeder in New Mexico", 2011 IEEE. (Year: 2011).*

Bao et al., "Battery Energy Storage System Load Shifting Control based on Real Time Load Forecast and Dynamic Programming", Aug. 2012, 8th IEEE International Conference on Automation Science and Engineering, Seoul, Korea. (Year: 2012).*

Extended European Search Report issued in counterpart European Application No. 18193860.6 dated Feb. 22, 2019 (nine (9) pages).

Extended European Search Report issued in counterpart European Application No. 18193854.9 dated Feb. 25, 2019 (nine (9) pages).

* cited by examiner

METHOD AND CONTROL DEVICE FOR OPERATING A STATIONARY, ELECTRIC ENERGY STORAGE THAT IS PROVIDED FOR AN ELECTRIC CONSUMPTION UNIT

CROSS REFERENCE TO RELATED APPLICATION

This application claims priority under 35 U.S.C. § 119 from European Patent Application No. 18193860.6, filed Sep. 11, 2018, the entire disclosure of which is herein expressly incorporated by reference.

This application contains subject matter related to U.S. application Ser. No. 16/565,696, entitled "Method and Control Device for Operating a Stationary, Electric Energy Storage that is Provided for an Electric Consumption Unit" filed on even date herewith.

BACKGROUND AND SUMMARY OF THE INVENTION

The invention is concerned with a method for operating an electric energy storage that is provided for an electric consumption unit. Such an electric consumption unit may be, e.g., a household. The electric consumption unit is also coupled to an electric power grid. The grid supplies electric power to the consumption unit under different supply conditions at different time periods. The electric power flow of the energy storage for discharging electric power to the electric consumption unit at one time and for charging the energy storage at another time is controlled by a control device which is also part of the invention. The invention also provides a system comprising the electric consumption unit and an electric energy storage and the inventive control device for the energy storage.

Utilizing stationary battery storage systems at residential households can play a big role in supporting grid resiliency but also in optimizing user or customer electricity bills. Different rate or tariff structures, e.g., in the United States, create an opportunity for using batteries or other energy storages as a storage resource to optimize the energy/grid usage times of customers for lowering their electricity expenses. The production of electricity from solar or another regenerative source does often not match with the typical consumption behavior of residential consumers. Especially in sunny states such as California or Hawaii solar production is highest during daytime hours. Usually the peak demand from consumers on the grid occurs later in the day during evening hours when the solar production is ramping down. Therefore, there is the need for shifting energy to times when the demand is highest. Because of this misalignment of energy supply and demand, Hawaii, for example, initiated a regulation that no longer reimburses customers for feeding excess solar energy into the grid. Without stationary battery storage, excess solar energy must be curtailed or customers are forced to downsize their solar systems. Stationary battery storage or another electric energy storage has the capability to shift daytime renewable energy for utilization on household loads in the evening, effectively increasing the percentage of renewable energy on an overall energy usage basis that can be consumed onsite, i.e. inside the electric consumption unit, like a household.

An algorithmic logic should cover these components: Energy usage of customers should be optimized to meet renewable energy feed-in requirements, if existing, provide an increased solar usage in the energy usage profiles of customers and optimize the customer's electricity bill by shifting loads intelligently.

It is an object of the present invention to control the electric power flow of a stationary energy storage that may be provided at an electric consumption unit as a storage for renewable energy and as an alternative power source during time periods when electric energy from a power grid is most expensive.

The invention provides a method for operating an electric energy storage that is provided for an electric consumption unit. Such an energy storage may comprise, e.g., at least one rechargeable battery and/or at least one array of capacitors. A storage capacity of such an energy storage may be larger than 10 Wh. Preferably, the energy storage is stationary. The electric consumption unit may be, e.g., a household or an office building. For energy transfer, the energy storage may be connected to the electric consumption unit or they may both be connected to the same public electric power grid. In any case, the electric consumption unit is additionally coupled to the electric power grid. The grid supplies electric power to the consumption unit under different supply conditions at different time periods. For example, different rates or tariffs may apply for the transferal of electric energy between the grid and the electric consumption unit.

For the energy storage, a control device observes the state of charge of the energy storage and controls an electric power flow of the energy storage by means of an electric power converter. Such a power converter may be, e.g., a bidirectional inverter or another power electronic device. The electric power flow is set to a value which results at each point in time from a respective active operation algorithm or operation logic. The control device performs the following steps:

providing different operation logics for controlling the power flow as a function of the state of charge and as a function of a total unit load, wherein the total unit load is a net balance value of a power consumption in the consumption unit and an internal power delivery or generation in the consumption unit, such that a negative total unit load in the consumption unit may indicate a surplus of electric power generated and not consumed by the consumption unit itself (for example, the consumption unit may comprise or be connected to a regenerative energy source—e.g. a solar energy source);

observing a status signal that is signaling the present and/or the next supply condition of the grid, such that it may be known to the control device which supply condition applies for the current time period and/or for the next time period;

selecting one of the operation logics as an active operation logic depending on a current value of the status signal, operating the power converter according to the active operation logic.

The quantity "total unit load" may be the resulting need of the electric consumption unit regarding of electric power, considering solar self-consumption, i.e. the electric consumption unit tries to satisfy its demand for electric power on the basis of the electric power delivered by a regenerative energy source and the total unit load indicates, whether more electric power is needed (total unit load greater 0) or whether there is a surplus of electric power from the regenerative power source (total unit load smaller 0). Note that positive and negative values result from the way how the direction of power flow is counted. If the power flow is measured in the opposite direction, the signs (greater 0, smaller zero) will, of course, be different. The invention is not dependent on the direction, in which the power flow is measured.

The different economic supply conditions may comprise different prices per energy unit (e.g. per Wh). The said status signal, signaling the current and/or next supply condition, may be an external signal received by the control device or it may be derived by the control device itself, e.g. on the basis of a table listing the supply conditions and the corresponding time periods, wherein by means of a clock signal, it may be derived, which time period is currently active.

A power grid may provide supply conditions that may be applied in order to prevent a supply shortage in the grid. If these conditions apply, this is called a Demand Response (DR) event. In the Demand Response type program, the user or customer receives either a price penalty for consuming electricity during a certain period (demand-response period) or a credit for not consuming electricity during a certain period (demand-response period, typically on the order of hours). Each demand-response period may be preceded by a respective pre-event period, when the upcoming demand-response period is announced.

Accordingly, one of the supply conditions is a demand-response supply condition which is valid during demand-response periods and one condition is a pre-event supply condition which is valid during pre-event periods each of which immediately precedes a respective demand-response period. For the pre-event supply condition a pre-event operation logic is selected, which comprises the following logic:

if a time duration remaining until the end of the present pre-event period is shorter than or equal to a predefined time interval, which is called here "stretched Final Charge Window", a positive power flow for charging the energy storage is set to a scaled value which is calculated such that the state of charge reaches a maximum level at the end of the pre-event period.

This ensures that for the following demand-response period the energy storage is fully charged. The charging process does not have to start at the beginning of the pre-event period. The charging may start as soon as the remaining time corresponds to the scaled Final Charge Window FCW. The value of the power flow is a scaled value, as the power flow must be adapted as a function of the current state of charge, as otherwise the maximum level might be reached before the end of the pre-event period or not at all. Scaling the value of the power flow adapts the power flow appropriately for reaching the maximum level exactly at the end of the pre-event period.

The invention also comprises embodiments that provide additional advantages.

In one embodiment, the Final Charge Window FCW is a time value needed for charging the energy storage from its present state of charge to the maximum level (100%), if a maximum converter power InvMaxPower of the power converter is used, i.e. the maximum possible power flow, and the stretched Final Charge Window $\alpha$*FCW is the Final Charge Window FCW multiplied by a stretch factor $\alpha$, with a greater than or equal to 1, wherein correspondingly the scaled value is the maximum converter power InvMaxPower divided by the stretch factor $\alpha$, i.e. InvMaxPower/$\alpha$. With $\alpha=1$, the stretched Final Charge Window can be set to the shortest possible value. With $\alpha>1$, the power converter can be operated with less strain.

In one embodiment, the pre-event operation logic comprises that:

if the time duration remaining until the end of the present pre-event period is greater than the stretched Final Charge Window, i.e. more time remains, and the total unit load is greater 0, indicating a net power consumption, the power flow is set to 0 independently of the state of charge, and otherwise, if the total unit load is smaller 0 indicating a net power delivery, a positive power flow is set for charging the energy storage, if the state of charge is below the maximum value (100%).

This embodiment ensures that excess electric energy delivered e.g. by a regenerative energy source of the consumption unit is used for charging the energy storage and thus for preparing it for the upcoming demand-response period.

In one embodiment, for the demand-response supply condition a demand-supply operation logic is applied, which comprises the following logic:

if the total unit load is greater 0, indicating a net power consumption, and the state of charge is greater than a predefined demand-response threshold, a negative power flow is set for discharging the energy storage, otherwise with the state of charge below the demand-response threshold, the energy flow may be set to 0;

if the total unit load is smaller 0, indicating a net power delivery, and either the state of charge is at a predefined maximum level or the state of charge is below the maximum level (100%) and net energy metering (NEM) applies, the power flow is set to 0, otherwise a positive power flow is set for charging the energy storage, if the total unit load is smaller 0.

This embodiment ensures that the energy storage is only charged, if no use can be made by the excess energy from the regenerative energy source by means of the NEM during demand response events. The embodiment provides the advantage that the energy storage will not be charged, if use can be made of any excess power delivered by the regenerative energy source on the basis of the NEM.

Net energy metering (NEM) describes the ability to feed into the grid the energy generated by the regenerative energy source (e.g. solar-generated electricity) and effectively earn the price of the time-specific retail purchase price of electricity for it. In other words, the value indicated by the meter which measures the energy transferred between the grid and the electric consumption unit may be reduced by feeding electric energy from the regenerative energy source and/or from the energy storage into the grid. For example, if the customer feeds in 10 kilowatt-hours (kWh) at an electricity rate of $0.15/kWh, the customer would earn 10 kWh*$0.15/kWh=$1.50 in this time for feeding in this amount of energy to the grid. Customers that do not have a NEM option in their utility tariff would not receive any payment (or bill credit) for the energy that was fed back into the grid. The state of Hawaii was the first state in the United States that implemented such a regulation to cope with the enormous amount of solar energy being overproduced midday. This overproduction represents an economic loss for customers with solar and raises the opportunity for battery energy storage systems to be implemented for shifting energy to other times when there is a greater need for electricity due to higher rates of consumption. It can be predicted that other states may start implementing such regulations when their respective generation with renewable energies increases to a certain percentage of overall grid capacity. Therefore, the control algorithm developed herein covers the case where there is no NEM or similar-type tariff available to customers.

In one embodiment, for a non-event period, when neither the pre-event period nor the demand-response period applies, a non-event operation logic is applied, which comprises:

if the total unit load is greater 0, indicating a net power consumption, and the state of charge is greater than a predefined demand-response threshold, a negative power flow is set for discharging the energy storage, otherwise with the state of charge below the demand-response threshold, the energy flow may be set to 0;

if the total unit load is smaller 0, indicating a net power delivery, and the state of charge is at the maximum level (100%), the power flow is set to 0, otherwise, if the total unit load is smaller 0, indicating a net power delivery, a positive power flow is set for charging the energy storage.

This embodiment makes advantageous use of the energy storage during non-event periods.

The method may also take care of not harming the battery in cases of a low state of charge, as has been described. Depending on the storage type, e.g. a type of battery, a specific battery threshold limit for discharge can be set.

In one embodiment, the absolute value of the power flow is limited by both a maximum converter power of the power converter and the absolute value of the total unit load, whichever is smaller. The limitation is preferably applied when the total unit load is negative. This embodiment ensures that the power converter is not overloaded and that for charging the energy storage only the excess electric power delivered by the regenerative energy source is used, i.e. no net energy from the grid itself is used. In other words, when adjusting the charge or discharge power of the energy storage, i.e., the power flow, the method always tries to meet the consumption/generation at the consumption unit level within the borders of the maximum charge and discharge capabilities (maximum converter power) of the stationary storage system.

For running an energy storage according to an embodiment of the inventive method, the invention provides a control device for controlling an electric power flow of an electric energy storage, wherein the control device comprises a processing unit that is designed to perform a method according to one of the preceding claims. As the inventive method provides is an algorithmic control logic, the method is preferably implemented in a cloud architecture component, i.e. the processing unit may be provided in the form of a network server architecture. The processing unit may be based on at least one central processing unit (CPU) and/or at least one micro-controller. The steps of the method may be implemented on the basis of a programming code that may comprise instructions that are designed to make the processing unit execute the method when the processing unit executes the programming code. The programming code may be stored in a computer readable medium, e.g. a data storage.

The invention also comprises the described system comprising an electric consumption unit and an electric energy storage and a control device according to the invention.

The invention also comprises the combinations of the features of the different embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

The embodiments explained in the following is a preferred embodiment of the invention. However, in the embodiment, the described components of the embodiment each represent individual features of the invention which are to be considered independently of each other and which each develop the invention also independently of each other and thereby are also to be regarded as a component of the invention in an individual manner or in another than the shown combination. Furthermore, the described embodiment can also be supplemented by further features of the invention already described.

In the figures, identical reference signs respectively indicate elements that provide the same functionality.

Figure 1:
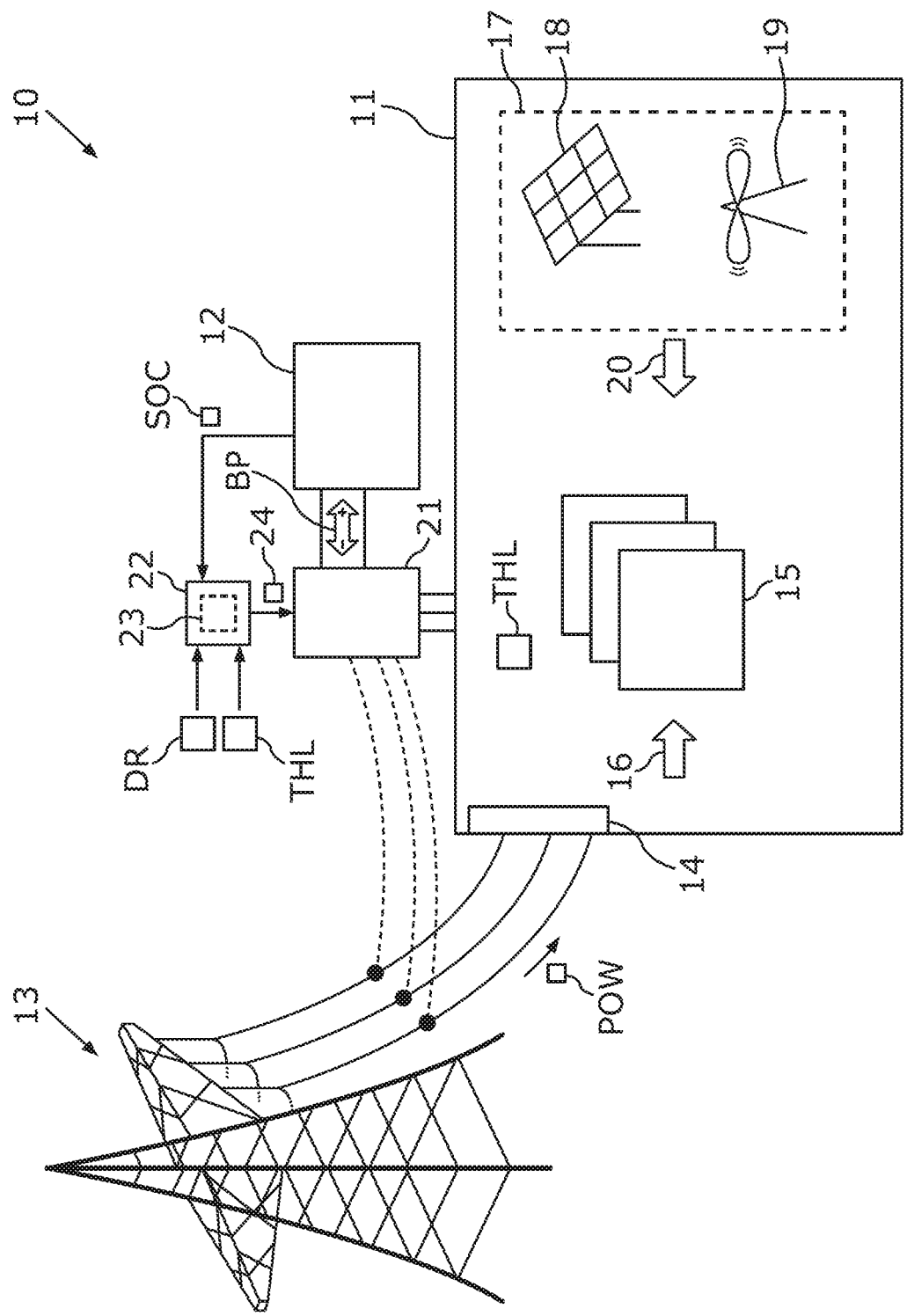
FIG. 1 is a schematic illustration of a system according to an embodiment of the invention.

FIG. 1 illustrates a system 10 that may comprise an electric consumption unit 11 and an electric energy storage 12 that may be provided for the electric consumption unit 11. The electric consumption unit 11 may be, for example, a household or an office building. In the following, it may be assumed that the energy storage 12 may comprise at least one rechargeable battery. For the sake of simplicity, it may be assumed that the electric consumption unit is a household.

The consumption unit 11 may be connected to an electric power grid 13. By means of the power grid 13, electric power POW may be transferred from, e.g., an electric power plant (for example a nuclear power plant) to the consumption unit 11. The consumption unit 11 may be connected to grid 13 together with other consumption units. The connection of consumption unit 11 may be obtained by means of a meter 14 which may measure the amount of electric energy provided to the consumption unit 11.

Within consumption unit 11, at least one electric consumer 15 may consume electric energy resulting in electric power consumption 16. Additionally, a regenerative energy source 17 may be provided. Energy source 17 represents all electric sources that may provide renewable electric energy. The energy source 17 may comprise at least one photovoltaic solar device 18 and/or at least one electric generator driven by wind. The regenerative energy source 17 may provide an electric power delivery 20. By means of the power delivery 20, the power consumption 16 may be at least partially compensated resulting in an overall net balance value which is termed here as total unit load THL describing, e.g., a total household load.

An electric power flow BP into the energy storage 12 may be controlled by way of a power converter 21 which can be, e.g., an electric inverter, particularly a bidirectional inverter. In the present description, a positive power flow BP indicates the transfer of electric energy into the energy storage, i.e. a charge CHRG, wherein a negative power flow BP indicates a discharge DIS off energy out of the energy storage 12. The converter 21 may be connected to the energy consumption unit 11 or it may directly be connected to grid 13, which is indicated in FIG. 1 by use of dashed lines. In the case that the converter 21 is directly connected to grid 13, an energy flow between inverter 21 and grid 13 may also be considered by meter 14 or by the utility provider of grid 13.

The converter 21 may be controlled by a control device 22 which may comprise a processing unit 23 for generating a control signal 24 for controlling converter 21. Control device 22 may observe a state of charge SOC of energy storage 12 and the total unit load THL. Additionally, control device 22 may receive a status signal DR which indicates a present supply condition C1, C2, C3 and/or a future (upcoming) supply condition, as it may be provided by grid 13. The possible supply conditions C1, C2, C3 are explained in connection with FIG. 2.

Figure 2:
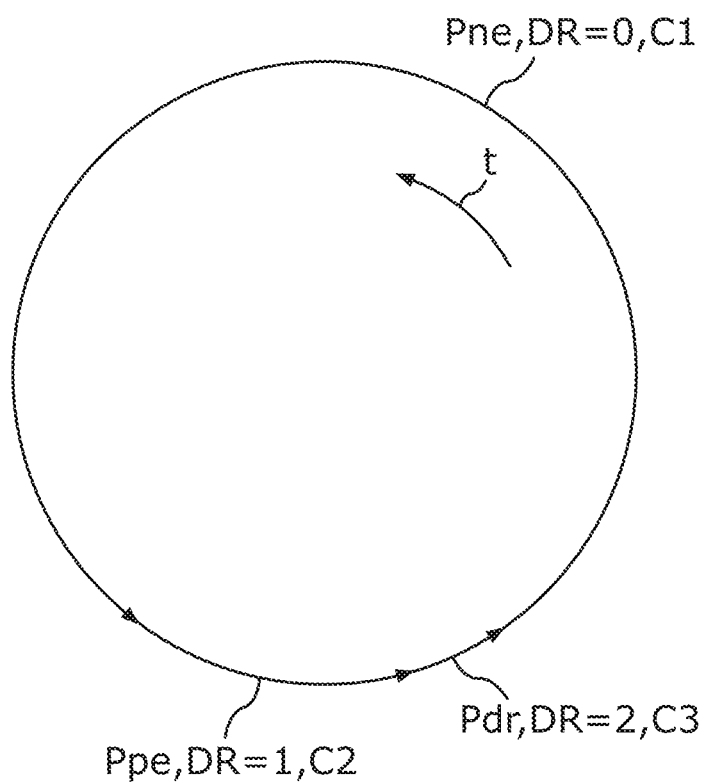
FIG. 2 is a diagram illustrating different time periods during which different supply condition apply for the case of a Demand Response scheme.

FIG. 2 illustrates how non-Time-of-Use Rate tariffs may apply over time t. At least one of the following phases may occur, each of which may be signaled by a predefined value of a status signal DR: a demand-response phase Pdr (DR=2, supply condition C3), a pre-event phase Ppe (DR=1, supply condition C2) and/or a non-event phase Pne (DR=0, supply condition C1). The values of DR are to be understood as being exemplary. FIG. 2 shows an example demand-response structure, wherein a possible time-order of different periods may be: a non-event period Pne, a pre-event period Ppe and a demand-response-period Pdr. Each demand-response period may be followed by a nonevent period Pne, again.

Figure 3:
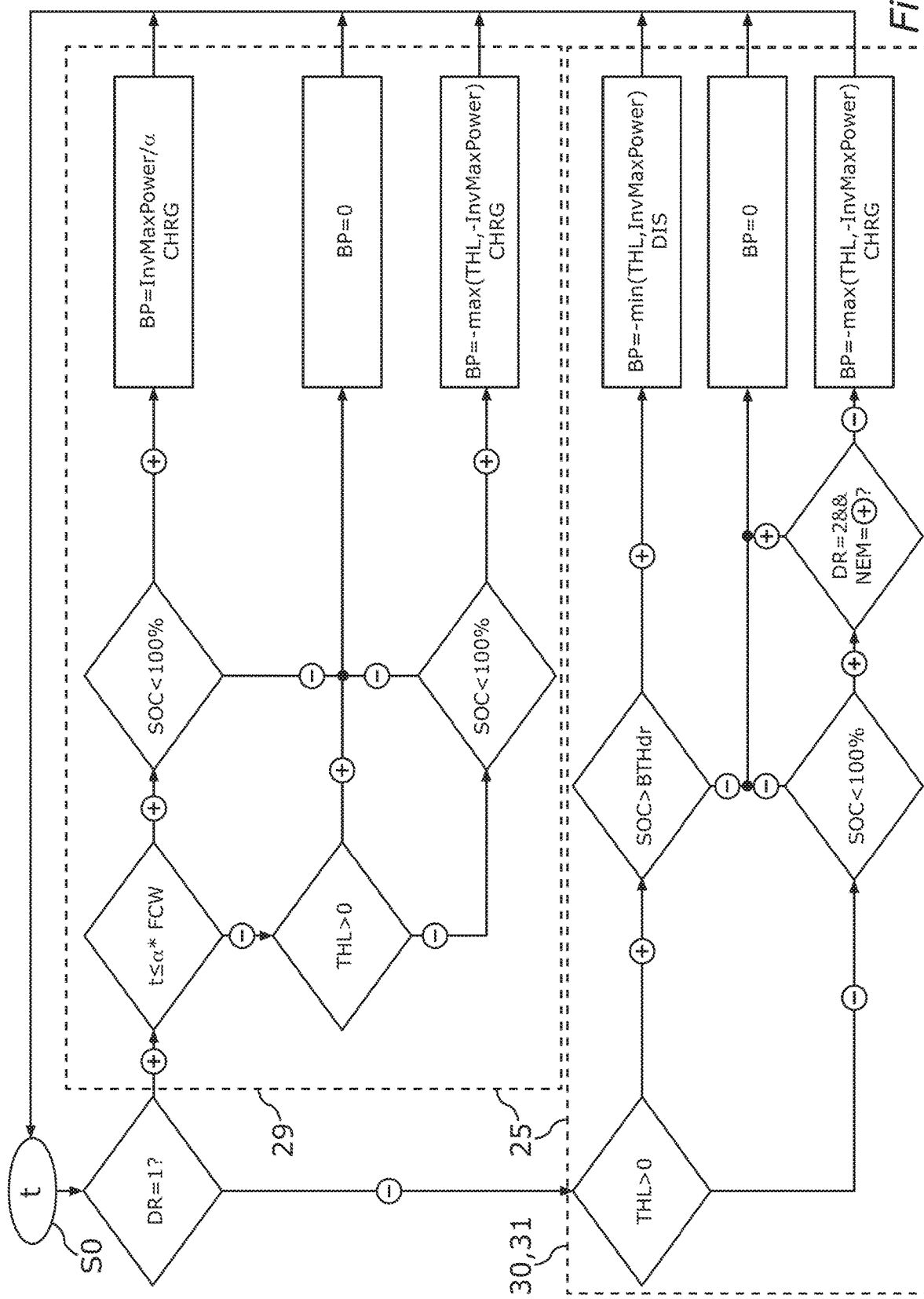
FIG. 3 is a flowchart of a method that may be performed by a control device of the system of FIG. 1.

FIG. 3 illustrates a flowchart of an algorithm logic for the non-time-of-use based tariffs, when the demand-response structure of FIG. 2 may apply. The flowchart starts at the respective current time t (S0). The algorithm may comprise several operation logics 25, i.e. a pre-event operation logic 29, a demand-response operation logic 30 and a non-event operation logic 31. As the demand-response operation logic 30 and the non-event operation logic 31 are very similar, they are represented by a common section of the flowchart in FIG. 3. They are distinguished by the condition DR=2 that must additionally ("&&") apply (indicating demand-response operation logic 30).

In the flowchart shown here, a "+"-Sign indicates "True" for the respective preceding logical test, and a "−"-Sign indicates "False".

Non-time-of-use rates, such as flat rates or tiered tariffs, do not have periods of time-based price differentials, therefore, it does not matter at what time of the day electricity is drawn from the grid 13. The goal of the energy storage control algorithm on this type of electricity rate tariff is to consume as much renewable energy onsite as possible, such as from solar generation. Therefore, if the customer has solar panels at his/her household or any regenerative energy source 17, then anytime there is excess energy generation and the energy storage 12 is not fully charged, the operation logic will recharge the energy storage 12 using this excess energy generation (THL<0). However, if there is never any excess energy generation e.g. from the solar panels after meeting onsite demand, the energy storage 12 would never get recharged.

Therefore, when the Total Unit Load (THL) is positive and there is no battery capacity remaining, electricity will be drawn from the grid in order to meet onsite loads. Since the price of electricity is the same regardless of the time of day, it does not make a cost difference to charge the battery from the grid in order to provide it to onsite loads at a later time. Additionally, doing so would create efficiency losses.

However, if the user is part of a Demand Response type program, such that the consumption unit 11 receives either a price penalty for consuming electricity during a certain period or a credit for not consuming electricity during a certain period, typically on the order of hours, (supply condition C3), the battery control algorithm as shown in FIG. 3 will operate the energy storage 12 similarly to that of a customer on a time-of-use tariff. The algorithm logic will check first whether there is an upcoming Demand Response event (supply condition C2, DR=1 indicates upcoming supply condition C3) and if so, the Demand Response trigger is set to "pre-event" mode (Ppe).

A Final Charge Window FCW is calculated as the remaining time before the higher-priced period begins (supply condition C3), such as a Demand Response period Pdr. Only in this case would the energy storage 12 recharge from the grid. However, in order to consume as much renewable energy onsite as possible and to reduce consumption of electricity from the utility grid, the energy storage 12 will wait to do so until the time remaining to fully recharge the energy storage 12 has exceeded the available time left before the Demand Response period (scaled FCW, i.e. α*FCW).

The Final Charge Window (FCW) is the calculation of the remaining charging time with maximum charging power. For energy storage safety reasons this timeframe can be stretched in order to charge the battery with a lower rate to minimize harm to the energy storage. This is provided by the stretch factor α which extends the charging window by dividing the maximum battery charging power (InvMaxPower) according to the following relation:

$T \leq \alpha * FCW$ then effective Inverter Charging Power is InvMaxPower/α with $\alpha \geq 1$ and α a real number.

If the remaining available time T until the next partial peak or peak period is longer than α*FCW, the energy storage 12 will be charged from excess solar only, when available. This logic ensures that there will be as much solar energy as possible in the energy storage 12. Alternatively, if the available time until the next partial peak or peak period is less than α*FCW, the energy storage 12 will be charged from the grid when there is no excess solar available to ensure that the energy storage 12 is fully charged before the next higher-priced period. Even if there is excess renewable energy (solar) available, the energy storage will be charged by InvMaxPower/alpha. It is possible that the energy storage 12 is going to be charged partially from excess renewable energy (solar) and additional grid power POW, if the generation of excess renewable energy (solar) is less than the needed charging power for meeting the requirements to meet the FCW time.

In this way, the energy storage 12 will attempt to charge with as much renewable energy as possible. After the energy storage 12 is fully recharged and the Demand Response event or higher price period has begun, the Demand Response trigger is set to "active" mode, allowing the energy storage 12 to discharge to onsite loads during this higher-priced period or charge from excess renewable energy if the customer is not eligible for a NEM tariff. If it is the case that the customer is eligible for a NEM tariff, instead of recharging the energy storage 12 from excess renewable energy (e.g. solar energy), it is more economically beneficial to feed the excess renewable energy back to the grid rather than storing it in the energy storage 12.

The described methodology takes into account the specific utility rate tariffs and combines the use cases of energy arbitrage with solar self-consumption to find the cycling algorithm that provides the most cost savings for the user.

The implementation example shows, how an energy storage 12 cycling algorithm for a stationary storage system in a residential environment can be provided.

REFERENCE SIGNS 10 system
11 electric consumption unit 12 energy storage
13 power grid
14 meter
15 electric consumer
16 power consumption
17 regenerative energy source
18 photovoltaic panel
19 wind generator
20 power delivery
21 power converter
22 control device
23 processing unit
24 control signal
25 operation logic
30 demand-response operation logic
31 non-event operation logic
C costs
C1, C2, C3 supply condition
BP power flow
BTHdr demand-response threshold
DR status signal
NEM net energy metering
InvMaxPower maximum converter power
POW electric power
Pne non-event period
Ppe pre-event period
Pdr demand-response period
SOC state of charge
t time
THL total unit load The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electric energy storage that is provided for an electric consumption unit, wherein the electric consumption unit is additionally coupled to an electric power grid and wherein the grid supplies electric power to the consumption unit under different supply conditions at different time periods and wherein a control device observes a state of charge of the energy storage and controls an electric power flow of the energy storage by way of an electric power converter, the method comprising the steps of:
providing different operation logics for controlling power flow as a function of the state of charge and a function of a total unit load, wherein the total unit load is a net balance value of a power consumption in the consumption unit and an internal power delivery in the power consumption unit;
observing a status signal that is signaling a present and/or a next supply condition of the grid;
selecting one of the operation logics as an active operation logic depending on a current value of the status signal;
operating the power converter according to the active operation logic,
wherein one of the supply conditions is a demand-response supply condition which is valid during demand-response periods and one of the supply conditions is a pre-event supply condition which is valid during pre-event periods each of which immediately precedes a respective demand-response period, and for the pre-event supply condition a pre-event operation logic is selected, which pre-event operation logic comprises:
if a time duration remaining until the end of the present pre-event period is shorter than or equal to a pre-defined stretched Final Charge Window, a positive power flow for charging the energy storage is set to a scaled value which is calculated such that the state of charge reaches a maximum level at the end of the pre-event period.

2. The method according to claim 1, wherein
a Final Charge Window is a time value needed for charging the energy storage from its present state of charge to a maximum level, if a maximum converter power of the power converter is used, and
the stretched Final Charge Window is the Final Charge Window multiplied by a stretch factor α, with a greater than or equal to 1, wherein the scaled value is the maximum converter power divided by the stretch factor α.

3. The method according to claim 1, wherein for the pre-event operation logic:
if the time duration remaining until the end of the present pre-event period is greater than the stretched Final Charge Window, and the total unit load is greater 0, indicating a net power consumption, the power flow for charging the energy storage is set to 0 independently of the state of charge, and otherwise, if the total unit load is smaller 0, indicating a net power delivery, a positive power flow is set for charging the energy storage, if the state of charge is below maximum value.

4. The method according to claim 1, wherein for the demand-response supply condition, a demand-supply operation logic is applied, which demand-supply operation logic comprises:
if the total unit load is greater 0, indicating a net power consumption, and the state of charge is greater than a predefined demand-response threshold, a negative power flow is set for discharging the energy storage,
if the total unit load is smaller 0, indicating a net power delivery, and either the state of charge is at a predefined maximum level or the state of charge is below the maximum level and net energy metering applies, the power flow is set to 0, otherwise, if the total unit load is smaller 0, indicating a net power delivery, a positive power flow is set for charging the energy storage.

5. The method according to claim 1, wherein for a non-event period, when neither the pre-event period nor the demand-response period applies, a non-event operation logic is applied, which non-event logic comprises:
if the total unit load is greater 0, indicating a net power consumption, and the state of charge is greater than a predefined demand-response threshold, a negative power flow is set for discharging the energy storage,
if the total unit load is smaller 0, indicating a net power delivery, and the state of charge is at the maximum level, the power flow is set to 0, otherwise, if the total unit load is smaller 0, a positive power flow is set for charging the energy storage.

6. The method according to claim 1, wherein an absolute value of the power flow is limited by both a maximum converter power of the power converter and an absolute value of the total unit load.

7. A control device for controlling an electric power flow of an electric energy storage, wherein the control device comprises a processing unit operatively configured to carry out the acts of:

providing different operation logics for controlling the power flow as a function of the state of charge and a function of a total unit load, wherein the total unit load is a net balance value of a power consumption in the consumption unit and an internal power delivery in the consumption unit;

observing a status signal that is signaling a present and/or a next supply condition of the grid;

selecting one of the operation logics as an active operation logic depending on a current value of the status signal;

operating the power converter according to the active operation logic, wherein one of the supply conditions is a demand-response supply condition which is valid during demand-response periods and one of the supply conditions is a pre-event supply condition which is valid during pre-event periods each of which immediately precedes a respective demand-response period, and for the pre-event supply condition a pre-event operation logic is selected, which pre-event operation logic comprises:

if a time duration remaining until the end of the present pre-event period is shorter than or equal to a pre-defined stretched Final Charge Window, a positive power flow for charging the energy storage is set to a scaled value which is calculated such that the state of charge reaches a maximum level at the end of the pre-event period.

8. A system, comprising:
an electric consumption unit;
an electric energy storage;
a power converter by which electric power flows to/from the energy storage; and
a control device, wherein the control device comprises a processing unit operatively configured to carry out the acts of:

providing different operation logics for controlling the power flow as a function of the state of charge and a function of a total unit load, wherein the total unit load is a net balance value of a power consumption in the consumption unit and an internal power delivery in the consumption unit;

observing a status signal that is signaling a present and/or a next supply condition of the grid;

selecting one of the operation logics as an active operation logic depending on a current value of the status signal;

operating the power converter according to the active operation logic, wherein one of the supply conditions is a demand-response supply condition which is valid during demand-response periods and one of the supply conditions is a pre-event supply condition which is valid during pre-event periods each of which immediately precedes a respective demand-response period, and for the pre-event supply condition a pre-event operation logic is selected, which pre-event operation logic comprises:

if a time duration remaining until the end of the present pre-event period is shorter than or equal to a pre-defined stretched Final Charge Window, a positive power flow for charging the energy storage is set to a scaled value which is calculated such that the state of charge reaches a maximum level at the end of the pre-event period.

* * * * *